United States Patent
Wang et al.

(10) Patent No.: US 12,284,554 B2
(45) Date of Patent: Apr. 22, 2025

(54) METHOD AND APPARATUS FOR HANDLING PROTOCOL DATA UNIT SESSION, AND ELECTRONIC DEVICE

(71) Applicant: VIVO MOBILE COMMUNICATION CO., LTD., Guangdong (CN)

(72) Inventors: Wen Wang, Guangdong (CN); Yanchao Kang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 647 days.

(21) Appl. No.: 17/512,830

(22) Filed: Oct. 28, 2021

(65) Prior Publication Data
US 2022/0053382 A1    Feb. 17, 2022

Related U.S. Application Data

(63) Continuation of application No. PCT/CN2020/087811, filed on Apr. 29, 2020.

(30) Foreign Application Priority Data

Apr. 29, 2019   (CN) .......................... 201910356405.1

(51) Int. Cl.
  *H04W 28/24*   (2009.01)
  *H04W 8/24*    (2009.01)
  (Continued)

(52) U.S. Cl.
  CPC ............. *H04W 28/24* (2013.01); *H04W 8/24* (2013.01); *H04W 76/10* (2018.02); *H04W 76/30* (2018.02)

(58) Field of Classification Search
  CPC .......................... H04W 28/02; H04W 20/0268
  See application file for complete search history.

(56) References Cited

U.S. PATENT DOCUMENTS

| 2017/0347341 | A1  | 11/2017 | Zhang et al. |
| 2019/0349892 | A1* | 11/2019 | Rico Alvarino ........ H04W 8/22 |
| 2020/0162958 | A1* | 5/2020  | Huang-Fu ......... H04W 28/0268 |

FOREIGN PATENT DOCUMENTS

| CN | 101359925 A | 2/2009 |
| CN | 103037356 A | 4/2013 |

(Continued)

OTHER PUBLICATIONS

Qualcomm Incorporated et al: "Handling errors due to missing QoS flow descriptions parameters for GBR QoS flows", 3GPP TSG-CI WGI, Meeting #113, West Palm Beach (FL), Nov. 26-30, 2018, C1-188970. Retrieved from the Internet: URL:http://www.3gpp.org/ftp/Meetings%5F3GP P%5FSYNC/CT/Docs/CP%2DI83039%2Ezip, 9 pages.

(Continued)

*Primary Examiner* — Kodzovi Acolatse
*Assistant Examiner* — Maryam Emadi
(74) *Attorney, Agent, or Firm* — Price Heneveld LLP

(57) ABSTRACT

Embodiments of this disclosure provide a method and an apparatus for handling a protocol data unit session, and an electronic device. The method includes: transmitting a protocol data unit PDU session release request to a network device in a case that at least one of an authorized quality of service QoS rule, packet filter, and/or authorized QoS flow description configured by a network device for the PDU session exceeds a maximum support capability set by user equipment for the PDU session.

16 Claims, 8 Drawing Sheets

(51) Int. Cl.
*H04W 76/10* (2018.01)
*H04W 76/30* (2018.01)

(56) References Cited

FOREIGN PATENT DOCUMENTS

CN 107852713 A 3/2018
WO WO-2019154036 A1 * 8/2019

OTHER PUBLICATIONS

VIVO: "Correction on the descriptions of QoS rules IE errors", 3GPP TSG-CT WG1, Meeting #115, Montreal (Canada), Feb. 25-Mar. 1, 2019, C1-191302. Retrieved from the Internet: URL:http://www.3gpp.org/ftp/tsg%5Fct/WG1%5Fmm%2Dcc%2Dsm%5Fex%2DCNI/TSGC1%5F115%5FMon treal/docs/C1%2D191302%2Ezip, 12 pages.

Intel: "Signalling a maximum number of supported/derived QoS rules", 3GPP TSG-CT WG1, Meeting #109, Montreal (Canada), Feb. 26-Mar. 2, 2018, C1-181289. Retrieved from the Internet: URL:http://www.3gpp.org/ftp/tsg%5Fct/WG1%5 Fmm%2Dcc%2Dsm%5Fex%2DCNI/TSGC1%5F109%5FMon treal/Docs/, 6 pages.

Intel Corporation: "Signalled QoS rules", 3GPP TSG-CT WG1, Meeting #108, Gothenburg, Sweden; Jan. 22-26, 2018, C1-180647. Retrieved from the Internet: URL:http://www.3gpp.org/ftp/Meetings%5F3GP P%5FSYNC/CT1/updates/update13/, 4 pages.

VIVO: "Handling of SGSM parameters", 3GPP TSG-CT WG1, Meeting #117, Reno (NV), May 13-17, 2019, C1-193278. Retrieved from the Internet: URL:http://www.3gpp.org/ftp/Meetings%5F3GP P%5FSYNC/CT1/Docs/C1%2DI93278%2Ezip, 21 pages.

3GPP TS 24.501 V16.4.0, France, Mar. 27, 2020, Retrieved from the Internet: URL:ftp://ftp.3gpp.org/Specs/archive/24_se ries/24.501/24501-g40.zip 24501-g40.doc, 666 pages.

3GPP TS 24.501 version 16.0.2 https://www.3gpp.org/ftp (Mar. 29, 2019).

Media Tek Inc., Title: Insufficient resources in the UE during the PDU session establishment procedure, 3GPP TSG-CT WG1 Meeting #113 C1-188437, West Palm Beach (Fl), USA, Nov. 26-30, 2018.

* cited by examiner

METHOD AND APPARATUS FOR HANDLING PROTOCOL DATA UNIT SESSION, AND ELECTRONIC DEVICE

CROSS-REFERENCE TO RELATED APPLICATIONS

This application is a continuation application of International Application No. PCT/CN2020/087811 filed on Apr. 29, 2020, which claims priority to Chinese Patent Application No. 201910356405.1, filed in China on Apr. 29, 2019, which are incorporated herein by reference in their entireties.

TECHNICAL FIELD

This disclosure relates to the field of communications technologies, and in particular, to a method and an apparatus for handling a protocol data unit session, and an electronic device.

BACKGROUND

The fifth-generation mobile communication core network (5G Core, 5GC) supports protocol data unit (PDU) connection, which is a service for exchanging PDUs between user equipment (UE) and a data network. The PDU connection service supports a PDU session established at a request from the UE. Specifically, if the UE needs to establish a PDU session, the UE transmits a PDU session establishment request message to a session management function (SMF). If a network side accepts the PDU session establishment request from the UE, the SMF transmits a PDU session establishment accept message to the UE. The PDU session establishment request message and the PDU session establishment accept message may include content such as an information element, a type/reference, a format, and a length.

In existing solutions, QoS rules and/or QoS flow descriptions configured by a network side for a PDU session might exceed a maximum support capability of UE. As a result, PDU session establishment may encounter an anomaly, and the anomalous PDU session continuously occupies network resources.

Information disclosed in the Background section is only for enhancement of understanding of a general background of this disclosure, and should not be taken as an acknowledgment or any form of suggestion that this information constitutes any related art already known to a person skilled in the art.

SUMMARY

An objective of embodiments of this application is to provide a method and an apparatus for handling a protocol data unit session, and an electronic device, in order to avoid an exception in a PDU session establishment.

To resolve the foregoing technical problems, the embodiments of this disclosure are implemented through the following aspects.

According to a first aspect, an embodiment of this disclosure provides a method for handling a protocol data unit session, applied to user equipment and including: transmitting a protocol data unit PDU session release request to a network device in a case that at least one of an authorized quality of service QoS rule, packet filter, and/or authorized QoS flow description configured by a network device for the PDU session exceeds a maximum support capability set by the user equipment for the PDU session.

According to a second aspect, an embodiment of this disclosure provides a method for handling a protocol data unit session, applied to user equipment and including: transmitting a maximum support capability set by the user equipment for the protocol data unit PDU session to a network device, where the maximum support capability set by the user equipment for the PDU session includes at least one of a maximum number of supported authorized quality of service QoS rules, a maximum number of supported packet filters, and/or a maximum number of supported authorized QoS flow descriptions.

According to a third aspect, an embodiment of this disclosure provides a method for handling a protocol data unit session, applied to a network device and including: receiving a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

According to a fourth aspect, an embodiment of this disclosure provides an apparatus for handling a protocol data unit session, including a first transmitting module, configured to transmit a PDU session release request to a network device in a case that at least one of an authorized quality of service QoS rule, packet filter, and/or authorized QoS flow description configured by the network device for the protocol data unit PDU session exceeds a maximum support capability set by user equipment for the PDU session.

According to a fifth aspect, an embodiment of this disclosure provides an apparatus for handling a protocol data unit session, including a second transmitting module, configured to transmit a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

According to a sixth aspect, an embodiment of this disclosure provides an apparatus for handling a protocol data unit session, including a first receiving module, configured to receive a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

According to a seventh aspect, an embodiment of this disclosure provides an electronic device, including a memory, a processor, and a computer-executable instruction stored in the memory and capable of running on the processor, where when the computer-executable instruction is executed by the processor, the steps of the method according to the first aspect or the second aspect are implemented.

According to an eighth aspect, an embodiment of this disclosure provides an electronic device, including a memory, a processor, and a computer-executable instruction stored in the memory and capable of running on the processor, where when the computer-executable instruction is executed by the processor, the steps of the method according to the third aspect are implemented.

According to a ninth aspect, an embodiment of this disclosure provides a computer-readable storage medium, where the computer-readable storage medium is configured to store a computer-executable instruction, and when the computer-executable instruction is executed by a processor, the steps of the method according to the first aspect, the second aspect, or the third aspect are implemented.

In the embodiments of this disclosure, a protocol data unit PDU session release request is transmitted to a network device in a case that at least one of an authorized quality of service QoS rule, packet filter, and/or authorized QoS flow description configured by the network device for the PDU session exceeds a maximum support capability set by user equipment for the PDU session, so that an exception in a PDU session establishment can be avoided, thereby further avoiding occupation of network resources by a PDU session with an exception.

BRIEF DESCRIPTION OF DRAWINGS

To describe the technical solutions in the embodiments of this disclosure or in the related art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings.

DETAILED DESCRIPTION

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

Figure 1:
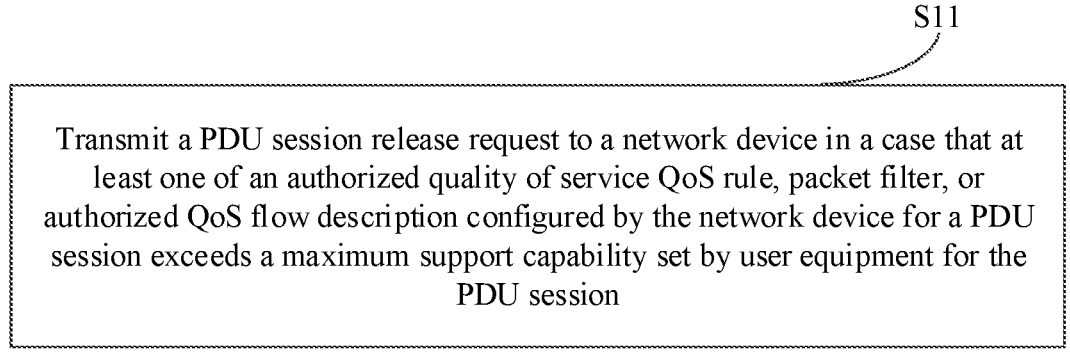
FIG. 1 is a schematic flowchart of a method for handling a protocol data unit session according to an embodiment of this disclosure.

FIG. 1 is a schematic flowchart of a method for handling a protocol data unit session according to an embodiment of this disclosure. The method may be executed by an electronic device, for example, user equipment. In other words, the method may be executed by software or hardware installed in the user equipment. As shown in the figure, the method may include the following step.

S11. Transmit a PDU session release request to a network device in a case that at least one of an authorized quality of service QoS rule, packet filter, and/or authorized QoS flow description configured by the network device for the PDU session exceeds a maximum support capability set by user equipment for the PDU session.

After the UE has initiated a PDU session establishment request, a network side may configure at least one of the authorized QoS rule, packet filter, and/or authorized QoS flow description for the PDU session, and transmit, to the UE, the at least one of the authorized QoS rule, packet filter, and/or authorized QoS flow description that has been configured.

The UE received the at least one of the authorized QoS rule, the packet filter, or the authorized QoS flow description, and determines whether or not the authorized QoS rule, the packet filter, and/or the authorized QoS flow description exceeds a support capability of the UE itself.

In a case that the at least one of the authorized QoS rule, packet filter, and/or authorized QoS flow description configured by the network device for the PDU session exceeds a maximum support capability of the UE, the PDU session release request is transmitted to the network device. After receiving the PDU session release request, the network device releases a resource for the PDU session according to the PDU session release request.

The phrases "at least one of A, B, or C" and "A, B, and/or C" in the embodiments of this disclosure may be understood to any one or more of the following seven schemes: A; B; C; A, B; A, C; B, C; and A, B, C. For example, in a case that at least one of A, B, or C exceeds the maximum support capability of the UE, it may be understood as any one or more of the following seven schemes: A exceeds the maximum support capability of the UE; B exceeds the maximum support capability of the UE; C exceeds the maximum support capability of the UE; both A and B exceed the maximum support capability of the UE; both A and C exceed the maximum support capability of the UE; both B and C exceed the maximum support capability of the UE, and A, B, and C all exceed the maximum support capability of the UE.

In this way, the PDU session release request is transmitted to the network device in the case that the at least one of the authorized quality of service QoS rule, packet filter, and/or authorized QoS flow description configured by the network device for the protocol data unit PDU session exceeds the maximum support capability set by the user equipment for the PDU session. The method for handling a protocol data unit session in this embodiment of this disclosure enables the network side to release a resource for the PDU session in a timely manner, to avoid occurrence of an exception in the PDU session and prevent the PDU session with the exception from occupying a network resource.

Figure 2:
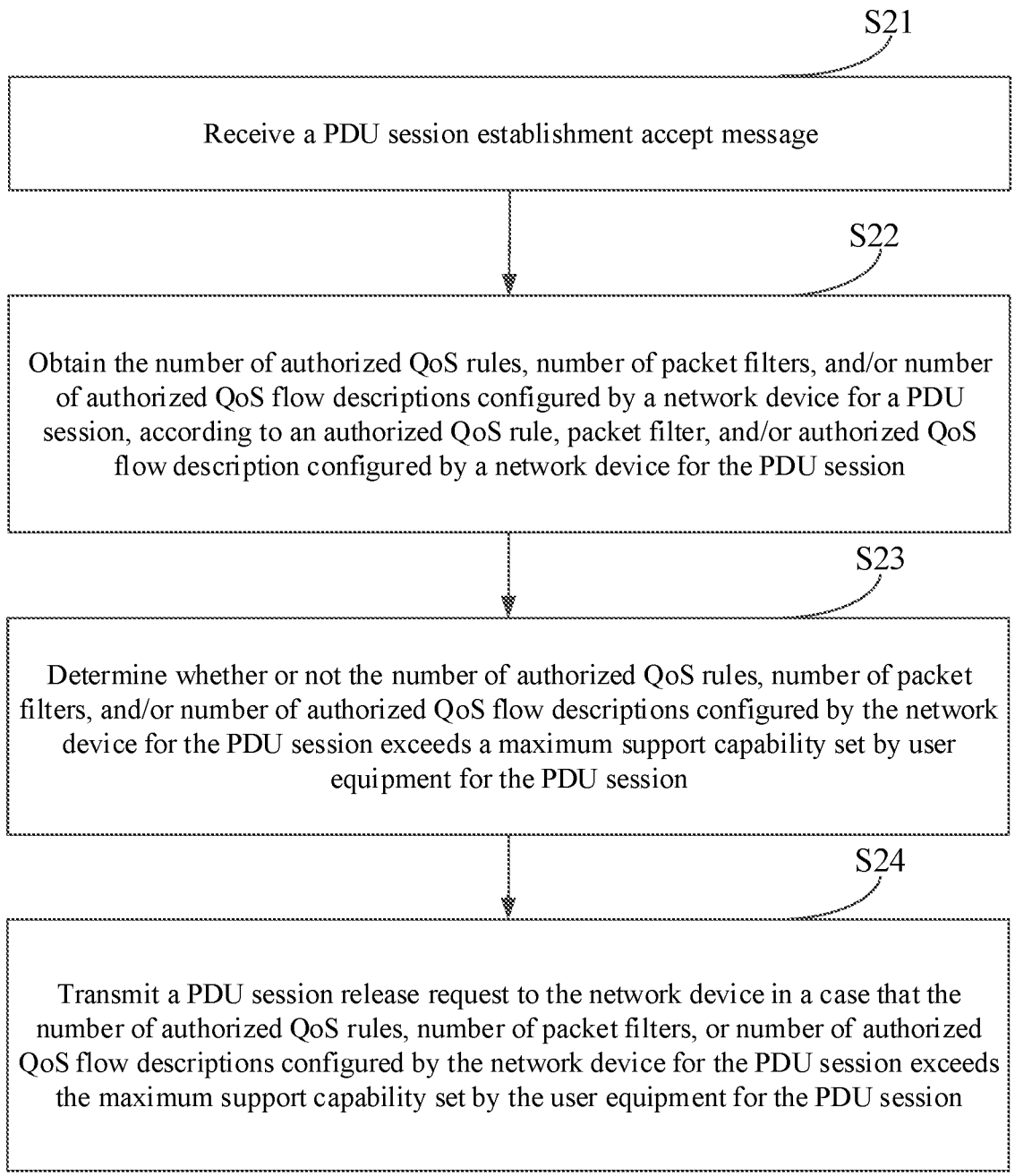
FIG. 2 is another schematic flowchart of a method for handling a protocol data unit session according to an embodiment of this disclosure.

FIG. 2 is another schematic flowchart of a method for handling a protocol data unit session according to an embodiment of this disclosure. The method may be executed by an electronic device, for example, user equipment. In other words, the method may be executed by software or hardware installed in the user equipment. As shown in the figure, the method may include the following steps.

S21. Receive a PDU session establishment accept message.

Before this step, the method further includes: transmitting, by the UE, a PDU session establishment request message to a network device. If a network side accepts the PDU session establishment request from the UE, the network device transmits a PDU session establishment accept message to the UE in this step. In a possible implementation, at least one of an authorized QoS rule, a packet filter, and/or an authorized QoS flow description is included in the PDU session establishment accept message.

S22: Obtain the number of authorized QoS rules, number of packet filters, and/or number of authorized QoS flow descriptions configured by the network device for the PDU session, according to the authorized QoS rule, packet filter, and/or authorized QoS flow description configured by the network device for the PDU session.

In this step, the number of authorized QoS rules, number of packet filters, or number of authorized QoS flow descriptions configured by the network device for the PDU session may be obtained according to the authorized QoS rule, the packet filter, or a length of the authorized QoS flow description.

For example, if one QoS flow description occupies (4−u) bytes, where u may be determined based on a length of a parameter list, and a maximum length that can be configured by the network side for QoS flow description is 65538 bytes, a maximum configured number of QoS flow descriptions may be approximately equal to 65538/(4−u). In this way, the UE may calculate and obtain the number of QoS flow descriptions according to the received authorized QoS flow description configured by the network device for the PDU session.

S23. Determine whether or not the number of authorized QoS rules, number of packet filters, and/or number of authorized QoS flow descriptions configured by the network device for the PDU session exceeds a maximum support capability set by the user equipment for the PDU session.

Specifically, it is determined whether or not the number of authorized QoS rules configured by the network device for the PDU session exceeds a maximum number of supported authorized QoS rules set by the UE for the PDU session;

or, it is determined whether or not the number of packet filters configured by the network device for the PDU session exceeds a maximum number of supported packet filters set by the UE for the PDU session;

or, it is determined whether or not the number of authorized QoS flow descriptions configured by the network device for the PDU session exceeds a maximum number of supported authorized QoS flow descriptions set by the UE for the PDU session.

The determination can be made for one, two, or all of the foregoing three parameters chosen.

S24. Transmit a PDU session release request to the network device in a case that the number of authorized QoS rules, number of packet filters, and/or number of authorized QoS flow descriptions configured by the network device for the PDU session exceeds the maximum support capability set by the user equipment for the PDU session.

In a case that the number of authorized QoS rules configured by the network device for the PDU session exceeds a maximum number of supported authorized QoS rules set by the user equipment for the PDU session, the number of packet filters exceeds a maximum number of supported packet filters set by the user equipment for the PDU session, and/or the number of authorized QoS flow descriptions configured by the network device for the PDU session exceeds the maximum number of supported authorized QoS flow descriptions set by the user equipment for the PDU session, the UE transmits a PDU session release request to the network device.

In a possible implementation, the PDU session release request includes a release cause for indicating lack of resources.

After receiving the PDU session release request, the network device releases a resource for the PDU session according to the PDU session release request.

In this way, the number of authorized QoS rules, number of packet filters, and/or number of authorized QoS flow descriptions configured by the network device for the PDU session is obtained according to the authorized QoS rule, packet filter, and/or authorized QoS flow description configured by the network device for the PDU session; and the PDU session release request is transmitted to the network device in the case that the number of authorized QoS rules, number of packet filters, or number of authorized QoS flow descriptions configured by the network device for the PDU session exceeds the maximum number of supported authorized QoS rules, maximum number of supported packet filters, or maximum number of supported authorized QoS flow descriptions set by the user equipment for the PDU session. The method for handling a protocol data unit session in this embodiment of this disclosure enables the network side to release a resource for the PDU session in a timely manner, to avoid occurrence of an exception in the PDU session and prevent the PDU session with the exception from occupying a network resource.

Figure 3:
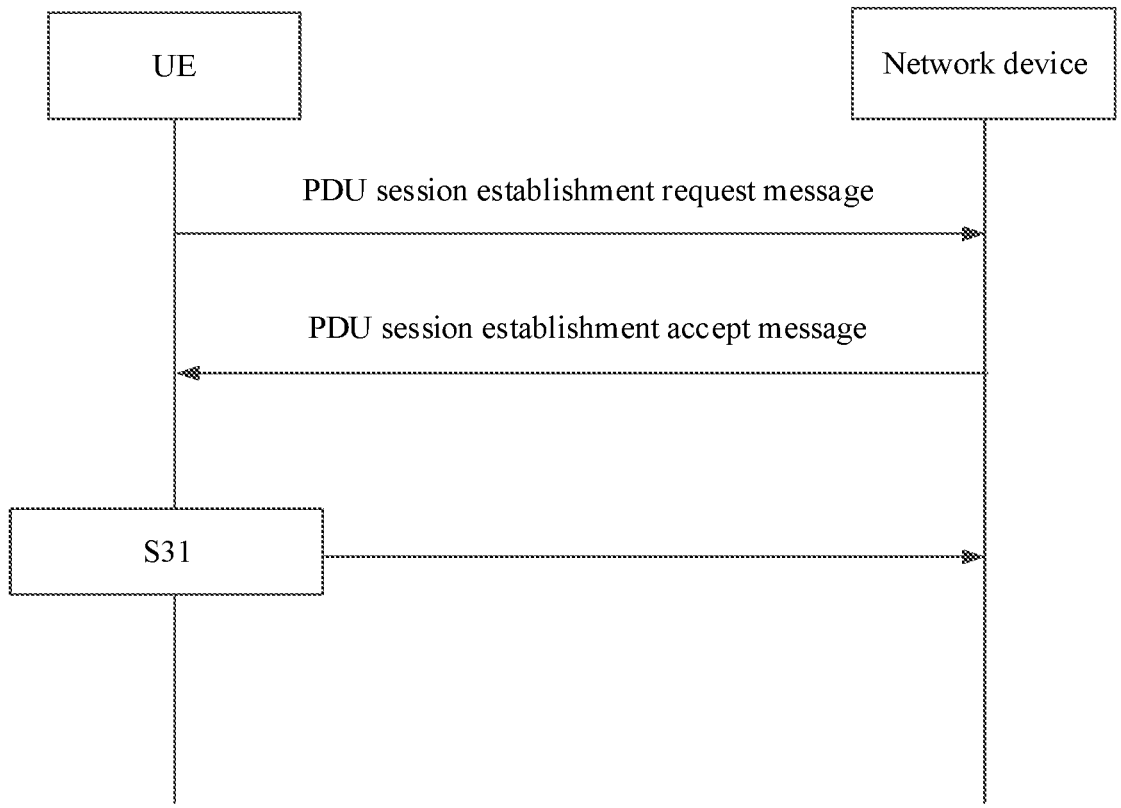
FIG. 3 is another schematic flowchart of a method for handling a protocol data unit session according to an embodiment of this disclosure.

FIG. 3 is a schematic flowchart of a method for handling a protocol data unit session according to an embodiment of this disclosure. The method may be executed by an electronic device, for example, user equipment. In other words, the method may be executed by software or hardware installed in the user equipment. As shown in the figure, the method may include the following step.

S31. If a maximum support capability set by the user equipment for the PDU session is updated, transmit a PDU session release request to a network device in a case that at least one of an authorized QoS rule, packet filter, and/or authorized QoS flow description configured by the network device for the PDU session exceeds an updated maximum support capability set by the user equipment for the PDU session.

The PDU session has already been established before this step. Before or after establishment of the PDU session, the UE may obtain the number of authorized QoS rules, number of packet filters, and/or number of authorized QoS flow descriptions configured by the network device for the PDU session, according to the authorized QoS rule, packet filter, and/or authorized QoS flow description configured by the network device for the PDU session.

For example, if one QoS flow description occupies (4−u) bytes, where u may be determined based on a length of a parameter list, and a maximum length that can be configured by the network side for QoS flow description is 65538 bytes, a maximum configured number of QoS flow descriptions may be approximately equal to 65538/(4−u). In this way, the UE may calculate and obtain the number of QoS flow descriptions according to the received authorized QoS flow description configured by the network device for the PDU session.

After the PDU session has already been established, if the maximum support capability of the UE is updated, it can be determined whether or not the number of authorized QoS rules, number of packet filters, and/or number of authorized QoS flow descriptions configured by the network device for the PDU session exceeds an updated maximum number of supported authorized QoS rules, updated maximum number of supported packet filters, and/or updated maximum number of supported authorized QoS flow descriptions set by the UE for the PDU session.

In addition, in a case that the number of authorized QoS rules, number of packet filters, or number of authorized QoS flow descriptions configured by the network device for the PDU session exceeds the updated maximum number of supported authorized QoS rules, updated maximum number of supported packet filters, or updated maximum number of supported authorized QoS flow descriptions set by the UE for the PDU session, a PDU session release request is transmitted to the network device.

In a possible implementation, the PDU session release request includes a release cause for indicating lack of resources. After receiving the PDU session release request, the network device releases a resource for the PDU session according to the PDU session release request.

In this way, if the maximum support capability set by the user equipment for the PDU session is updated, the PDU session release request is transmitted to the network device in the case that the at least one of the authorized QoS rule, packet filter, and/or authorized QoS flow description configured by the network device for the PDU session exceeds the updated maximum support capability set by the user equipment for the PDU session. The method for handling a protocol data unit session in this embodiment of this disclosure enables the network side to release a resource for the PDU session in a timely manner, to avoid occurrence of an exception in the PDU session and prevent the PDU session with the exception from occupying a network resource in a case that the maximum support capability of the UE changes and is not enough to support the PDU session.

Figure 4:
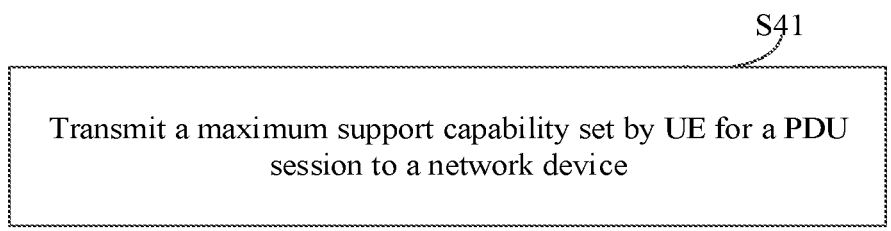
FIG. 4 is a schematic flowchart of a method for handling a protocol data unit session according to an embodiment of this disclosure.

FIG. 4 is a schematic flowchart of a method for handling a protocol data unit session according to an embodiment of this disclosure. The method may be executed by an electronic device, for example, user equipment. In other words, the method may be executed by software or hardware installed in the user equipment. As shown in the figure, the method may include the following step.

S41. Transmit a maximum support capability set by the UE for the PDU session to a network device.

The maximum support capability set by the user equipment for the PDU session includes at least one of a maximum number of supported authorized quality of service QoS rules, a maximum number of supported packet filters, and/or a maximum number of supported authorized QoS flow descriptions.

The UE transmits, to a network side, the at least one of the maximum number of supported authorized quality of service QoS rules, maximum number of supported packet filters, and/or maximum number of supported authorized QoS flow descriptions set by itself for the PDU session, so that the network side can be informed of the maximum support capability of the UE in a timely manner, and allocate to the UE, based on the maximum support capability of the UE, at least one of an authorized QoS rule, packet filter, and/or authorized QoS flow description for the PDU session.

In this way, the maximum support capability set by the UE for the PDU session is transmitted to the network device, where the maximum support capability set by the user equipment for the PDU session includes the at least one of the maximum number of supported authorized quality of service QoS rules, maximum number of supported packet filters, and/or maximum number of supported authorized QoS flow descriptions. The method for handling a protocol data unit session in this embodiment of this disclosure enables the network side to be informed of the maximum support capability of the UE in a timely manner, and allocate to the UE, based on the maximum support capability of the UE, the at least one of the authorized QoS rule, packet filter, and/or authorized QoS flow description for the PDU session, thereby avoiding an exception in establishment of the PDU session.

Figure 5:
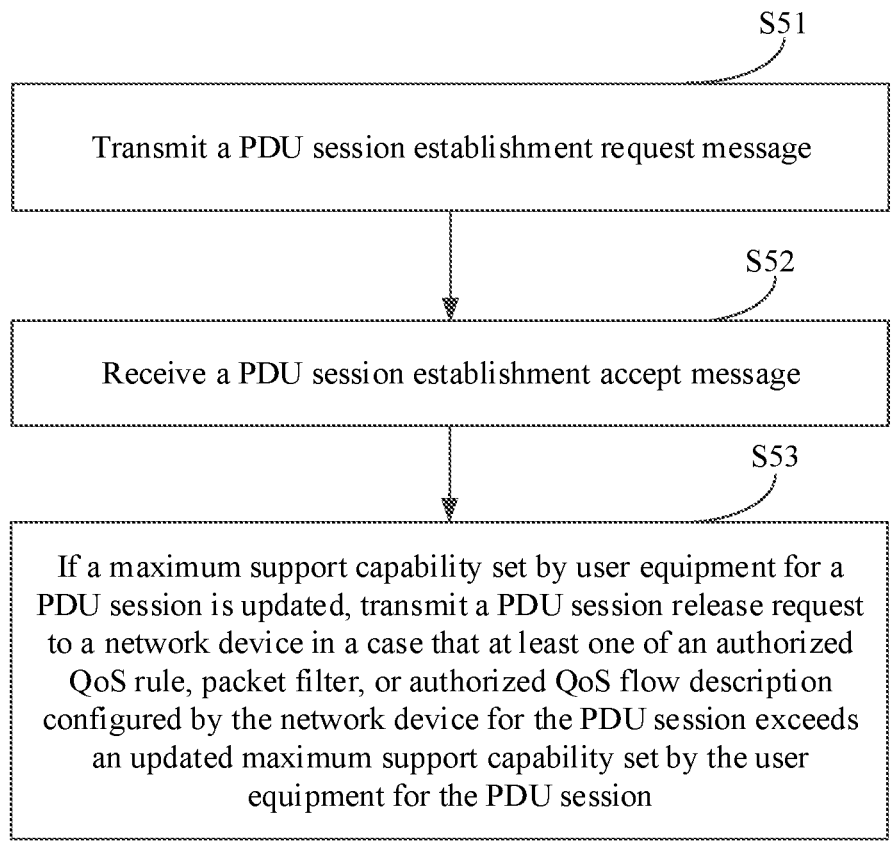
FIG. 5 is another schematic flowchart of a method for handling a protocol data unit session according to an embodiment of this disclosure.

FIG. 5 is a schematic flowchart of a method for handling a protocol data unit session according to an embodiment of this disclosure. The method may be executed by an electronic device, for example, user equipment. In other words, the method may be executed by software or hardware installed in the user equipment. As shown in the figure, the method may include the following steps.

S51. Transmit a PDU session establishment request message.

The PDU session establishment request message carries at least one of a maximum number of supported authorized quality of service QoS rules, maximum number of supported packet filters, and/or maximum number of supported authorized QoS flow descriptions set by the UE for the PDU session, so that a network side can be informed of a maximum support capability of the UE in a timely manner, and allocate to the UE, based on the maximum support capability of the UE, at least one of an authorized QoS rule, packet filter, and/or authorized QoS flow description for the PDU session.

S52. Receive a PDU session establishment accept message.

The network side allocates to the UE, based on the maximum support capability of the UE, the at least one of the authorized QoS rule, packet filter, and/or authorized QoS flow description for the PDU session, where the at least one of the authorized QoS rule, packet filter, and/or authorized QoS flow description configured by the network device for the PDU session may be configured in the PDU session establishment accept message.

A corresponding number of authorized QoS rules configured by the network device for the PDU session does not exceed the maximum number of supported authorized QoS rules set by the UE for the PDU session. A corresponding number of packet filters configured by the network device for the PDU session does not exceed the maximum number of supported packet filters set by the UE for the PDU session. A corresponding number of authorized QoS flow descriptions configured by the network device for the PDU session does not exceed the maximum number of supported authorized QoS flow descriptions set by the UE for the PDU session.

S53. If the maximum support capability set by the user equipment for the PDU session is updated, transmit a PDU session release request to the network device in a case that the at least one of the authorized QoS rule, packet filter, and/or authorized QoS flow description configured by the network device for the PDU session exceeds an updated maximum support capability set by the user equipment for the PDU session.

Through this step, the PDU session can be released in a timely manner, to avoid an exception in the PDU session and a waste of network resources in a case that the updated maximum support capability of the UE is not enough to support the PDU session.

In this way, the maximum support capability set by the user equipment for the PDU session is transmitted, where the maximum support capability set by the user equipment for the PDU session includes the at least one of the maximum number of supported authorized quality of service QoS rules, maximum number of supported packet filters, and/or maximum number of supported authorized QoS flow descriptions. The method for handling a protocol data unit session in this embodiment of this disclosure enables the network side to be informed of the maximum support capability of the UE in a timely manner, and allocate to the UE, based on the maximum support capability of the UE, the at least one of the authorized QoS rule, packet filter, and/or authorized QoS flow description for the PDU session to the UE based on the maximum support capability of the UE, thereby avoiding an exception in establishment of the PDU session.

In addition, if the maximum support capability set by the user equipment for the PDU session is updated, the PDU session release request to the network device is transmitted in the case that the at least one of the authorized QoS rule, packet filter, and/or authorized QoS flow description configured by the network device for the PDU session exceeds the updated maximum support capability set by the user equipment for the PDU session. The method for handling a protocol data unit session in this embodiment of this disclosure can release the PDU session in a timely manner, to avoid an exception in the PDU session and a waste of network resources in a case that an updated maximum support capability of the UE is not enough to support the PDU session.

Figure 6:
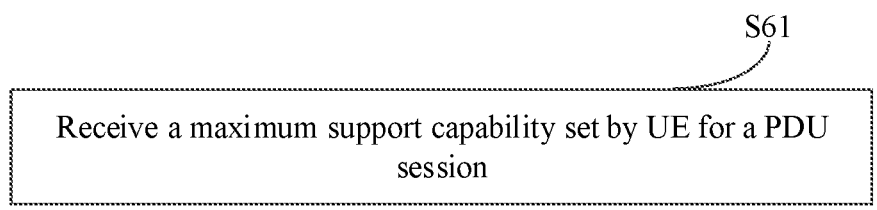
FIG. 6 is another schematic flowchart of a method for handling a protocol data unit session according to an embodiment of this disclosure.

FIG. 6 is another schematic flowchart of a method for handling a protocol data unit session according to an embodiment of this disclosure. The method may be executed by an electronic device, for example, an SMF entity at a network side. In other words, the method may be executed by software or hardware installed at the SMF. As shown in the figure, the method may include the following step.

S61. Receive a maximum support capability set by UE for the PDU session.

The maximum support capability set by the UE for the PDU session includes at least one of a maximum number of supported authorized quality of service QoS rules, a maximum number of supported packet filters, and/or a maximum number of supported authorized QoS flow descriptions.

A network device allocates to the UE, based on the maximum support capability of the UE, at least one of an authorized QoS rule, a packet filter, and/or an authorized QoS flow description for the PDU session.

A corresponding number of authorized QoS rules configured by the network device for the PDU session does not exceed the maximum number of supported authorized QoS rules set by the user equipment for the PDU session; a corresponding number of packet filters configured by the network device for the PDU session does not exceed the maximum number of supported packet filters set by the user equipment for the PDU session, and a corresponding number of authorized QoS flow descriptions configured by the network device for the PDU session does not exceed the maximum number of supported authorized QoS flow descriptions set by the user equipment for the PDU session.

In this way, the at least one of the maximum number of supported authorized quality of service QoS rules, maximum number of supported packet filters, and/or maximum number of supported authorized QoS flow descriptions set by the user equipment for the packet data unit PDU session is received. The method for handling a protocol data unit session in this embodiment of this disclosure enables the network side to be informed of the maximum support capability of the UE in a timely manner, and allocate to the UE, based on the maximum support capability of the UE, the at least one of the authorized QoS rule, packet filter, and/or authorized QoS flow description for the PDU session, thereby avoiding an exception in establishment of the PDU session.

Figure 7:
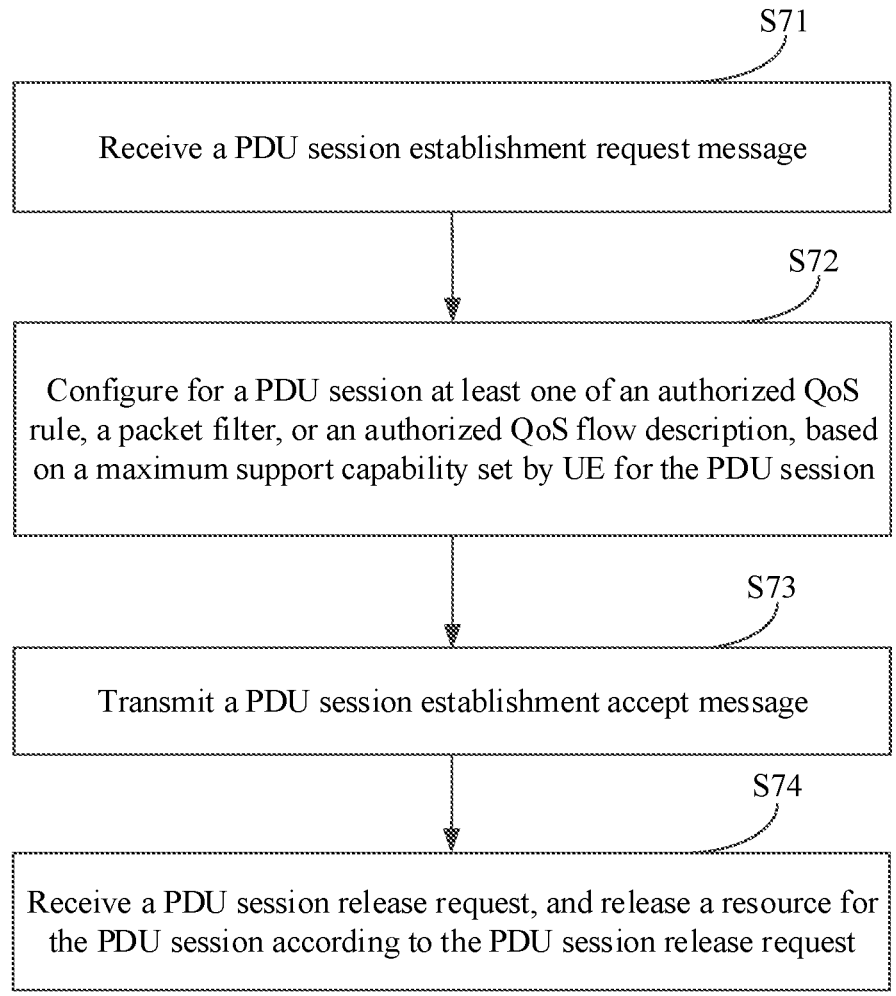
FIG. 7 is another schematic flowchart of a method for handling a protocol data unit session according to an embodiment of this disclosure.

FIG. 7 is another schematic flowchart of a method for handling a protocol data unit session according to an embodiment of this disclosure. The method may be executed by an electronic device, for example, an SMF entity at a network side. In other words, the method may be executed by software or hardware installed at the SMF. As shown in the figure, the method may include the following steps.

S71. Receive a PDU session establishment request message.

The PDU session establishment request message may include at least one of a maximum number of supported authorized quality of service QoS rules, maximum number of supported packet filters, and/or maximum number of supported authorized QoS flow descriptions set by UE for the PDU session.

A network device receives the at least one of the maximum number of supported authorized quality of service QoS rules, maximum number of supported packet filters, and/or maximum number of supported authorized QoS flow descriptions set by the UE for the PDU session, and allocates to the UE, based on a maximum support capability of the UE, at least one of an authorized QoS rule, a packet filter, and/or an authorized QoS flow description for the PDU session.

S72. Configure for the PDU session at least one of an authorized QoS rule, a packet filter, and/or an authorized QoS flow description, based on a maximum support capability set by the UE for the PDU session.

Specifically, a corresponding number of authorized QoS rules configured by the network device for the PDU session does not exceed the maximum number of supported authorized QoS rules set by the user equipment for the PDU session; a corresponding number of packet filters configured by the network device for the PDU session does not exceed the maximum number of supported packet filters set by the user equipment for the PDU session; and a corresponding number of authorized QoS flow descriptions configured by the network device for the PDU session does not exceed the maximum number of supported authorized QoS flow descriptions set by the user equipment for the PDU session.

S73. Transmit a PDU session establishment accept message.

The PDU session establishment accept message may include the at least one of the authorized QoS rule, packet filter, and/or authorized QoS flow description configured by the network device for the PDU session.

S74. Receive a PDU session release request, and release a resource for the PDU session according to the PDU session release request.

If the at least one of the maximum number of supported authorized quality of service QoS rules, maximum number of supported packet filters, and/or maximum number of supported authorized QoS flow descriptions set by the UE for the PDU session is updated, the PDU session release request is transmitted to the network device in a case that the at least one of the authorized QoS rule, packet filter, and/or authorized QoS flow description configured by the network device for the PDU session exceeds the maximum number of supported authorized QoS rules, maximum number of supported packet filters, and/or maximum number of supported authorized QoS flow descriptions set by the user equipment for the PDU session.

The network device receives the PDU session release request, and releases the resource for the PDU session according to the PDU session release request, so that the PDU session can be released in a timely manner, to avoid an exception in the PDU session and a waste of network resources in a case that an updated maximum support capability of the UE is not enough to support the PDU session.

In this way, the maximum support capability set by the user equipment for the PDU session is received. The method for handling a protocol data unit session in this embodiment of this disclosure enables the network side to be informed of the maximum support capability of the UE in a timely manner, and allocate to the UE, based on the maximum support capability of the UE, the at least one of the authorized QoS rule, packet filter, and/or authorized QoS flow description for the PDU session, thereby avoiding an exception in establishment of the PDU session.

In addition, the at least one of the authorized QoS rule, packet filter, and/or authorized QoS flow description configured by the network device for the PDU session is transmitted. The method for handling a protocol data unit session in this embodiment of this disclosure can transmit, to the UE, the at least one of the authorized QoS rule, packet filter, and/or authorized QoS flow description that has been configured, so as to establish the PDU session in a timely manner.

In addition, the PDU session release request is received, and the resource for the PDU session is released according to the PDU session release request. The method for handling a protocol data unit session in this embodiment of this disclosure can release the PDU session in a timely manner, to avoid an exception in the PDU session and a waste of network resources in a case that an updated maximum support capability of the UE is not enough to support the PDU session.

Figure 8:
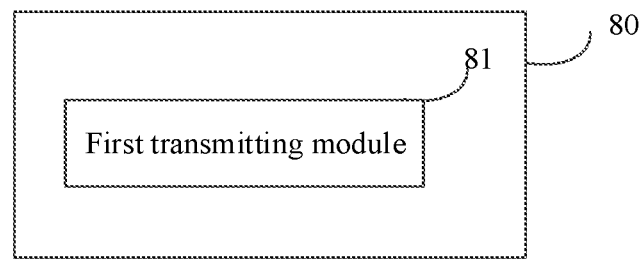
FIG. 8 is a schematic structural diagram of an apparatus for handling a protocol data unit session according to an embodiment of this disclosure.

FIG. 8 is a schematic structural diagram of an apparatus for handling a protocol data unit session according to an embodiment of this disclosure. The apparatus 80 includes: a first transmitting module 81.

The first transmitting module 81 is configured to transmit a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

The apparatus 80 in this embodiment of this disclosure can perform the corresponding steps in the foregoing method embodiment in FIG. 1, and achieve the same or similar functions and beneficial effects. Details are not described herein again.

Figure 9:
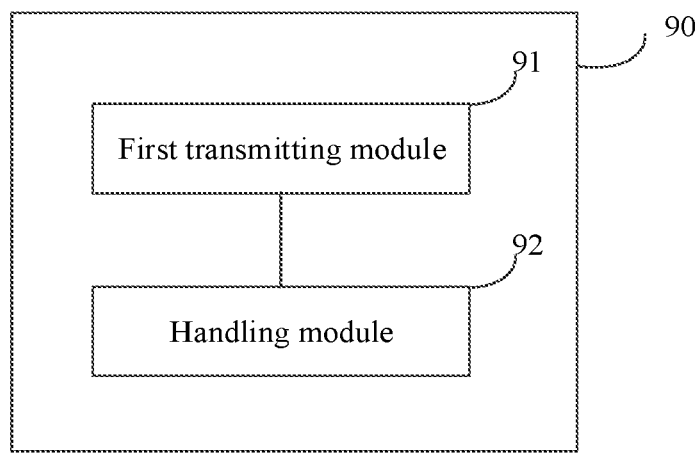
FIG. 9 is another schematic structural diagram of an apparatus for handling a protocol data unit session according to an embodiment of this disclosure.

FIG. 9 is another schematic structural diagram of an apparatus for handling a protocol data unit session according to an embodiment of this disclosure. The apparatus 90 includes: a first transmitting module 91 and a handling module 92.

The first transmitting module 91 is configured to transmit a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

The handling module 92 is configured to obtain, before the PDU session release request is transmitted to the network device, the number of authorized QoS rules, number of packet filters, and/or number of authorized QoS flow descriptions configured by the network device for the PDU session, according to the authorized QoS rule, packet filter, and/or authorized QoS flow description configured by the network device for the PDU session; and determine whether or not the number of authorized QoS rules, number of packet filters, and/or number of authorized QoS flow descriptions configured by the network device for the PDU session exceeds a maximum support capability set by the user equipment for the PDU session, where the maximum support capability set by the user equipment for the PDU session includes a maximum number of supported authorized QoS rules, maximum number of supported packet filters, and/or maximum number of supported authorized QoS flow descriptions configured by the user equipment for the PDU session.

In a possible implementation, the first transmitting module 91 is configured to, if the maximum support capability set by the user equipment for the PDU session is updated, transmit a PDU session release request to the network device in a case that the at least one of the authorized QoS rule, packet filter, and/or authorized QoS flow description configured by the network device for the PDU session exceeds an updated maximum support capability set by the user equipment for the PDU session.

In a possible implementation, the PDU session release request transmitted by the first transmitting module 91 includes a release cause for indicating lack of resources.

In a possible implementation, the at least one of the authorized QoS rule, packet filter, and/or authorized QoS flow description handled by the handling module 92 is included in the PDU session establishment accept message.

The apparatus 90 in this embodiment of this disclosure can perform the corresponding steps in the foregoing method embodiments in FIG. 2 and FIG. 3, and achieve the same or similar functions and beneficial effects. Details are not described herein again.

Figure 10:
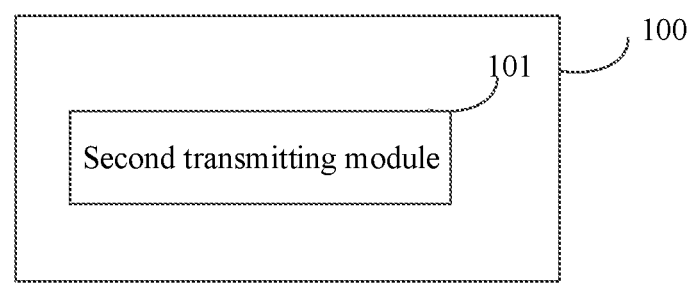
FIG. 10 is another schematic structural diagram of an apparatus for handling a protocol data unit session according to an embodiment of this disclosure.

FIG. 10 is another schematic structural diagram of an apparatus for handling a protocol data unit session according to an embodiment of this disclosure. The apparatus 100 includes: a second transmitting module 101.

The second transmitting module 101 is configured to transmit a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

The apparatus 100 in this embodiment of this disclosure can perform the corresponding steps in the foregoing method embodiment in FIG. 4, and achieve the same or similar functions and beneficial effects. Details are not described herein again.

Figure 11:
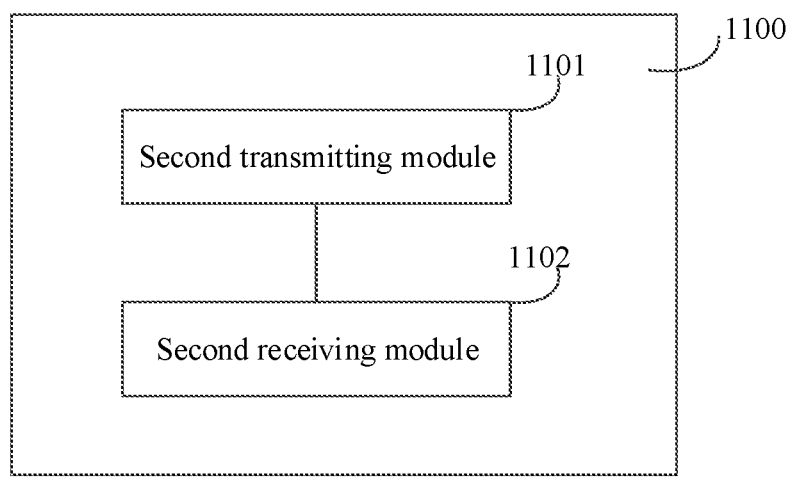
FIG. 11 is another schematic structural diagram of an apparatus for handling a protocol data unit session according to an embodiment of this disclosure.

FIG. 11 is another schematic structural diagram of an apparatus for handling a protocol data unit session according to an embodiment of this disclosure. The apparatus 1100 includes: a second transmitting module 1101 and a second receiving module 1102.

The second transmitting module 1101 is configured to transmit a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

The second receiving module 1102 is configured to: after the maximum support capability set by the user equipment for the PDU session is transmitted to a network device, receive at least one of an authorized QoS rule, packet filter, and/or authorized QoS flow description configured by the network device for the PDU session.

A corresponding number of authorized QoS rules configured by the network device for the PDU session does not exceed the maximum number of supported authorized QoS rules set by the user equipment for the PDU session; a corresponding number of packet filters configured by the network device for the PDU session does not exceed the maximum number of supported packet filters set by the user equipment for the PDU session; and a corresponding number of authorized QoS flow descriptions configured by the network device for the PDU session does not exceed the maximum number of supported authorized QoS flow descriptions set by the user equipment for the PDU session.

In a possible implementation, the second transmitting module 1101 is further configured to, if the maximum support capability set by the user equipment for the PDU session is updated, transmit a PDU session release request to the network device in a case that the at least one of the authorized QoS rule, packet filter, and/or authorized QoS flow description configured by the network device for the PDU session exceeds an updated maximum support capability set by the user equipment for the PDU session.

In a possible implementation, the maximum support capability set by the user equipment for the PDU session and transmitted by the second transmitting module 1101 is included in a PDU session establishment request message; and the authorized QoS rule, packet filter, or authorized QoS flow description configured by the network device for the PDU session and received by the second receiving module 1102 is included in a PDU session establishment accept message.

The apparatus 1100 in this embodiment of this disclosure can perform the corresponding steps in the foregoing method embodiment in FIG. 5, and achieve the same or similar functions and beneficial effects. Details are not described herein again.

Figure 12:
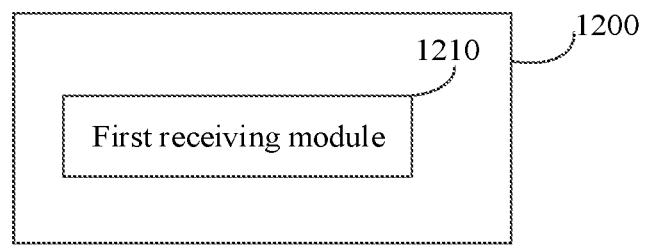
FIG. 12 is another schematic structural diagram of an apparatus for handling a protocol data unit session according to an embodiment of this disclosure.

FIG. 12 is another schematic structural diagram of an apparatus for handling a protocol data unit session according to an embodiment of this disclosure. The apparatus 1200 includes: a first receiving module 1210.

The first receiving module 1210 is configured to receive a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

The apparatus 1200 in this embodiment of this disclosure can perform the corresponding steps in the foregoing method embodiment in FIG. 6, and achieve the same or similar functions and beneficial effects. Details are not described herein again.

Figure 13:
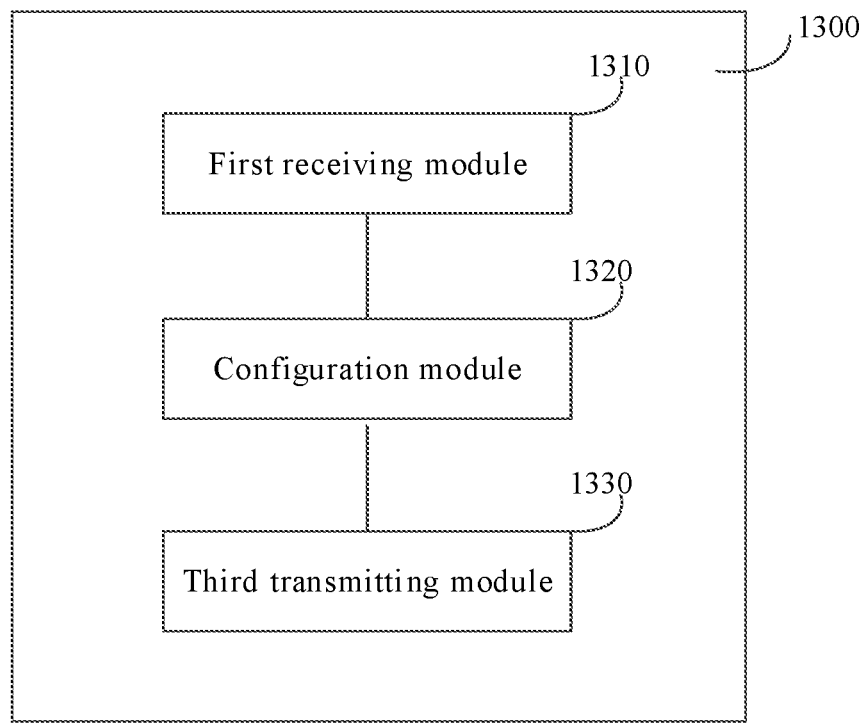
FIG. 13 is another schematic structural diagram of an apparatus for handling a protocol data unit session according to an embodiment of this disclosure.

FIG. 13 is another schematic structural diagram of an apparatus for handling a protocol data unit session according to an embodiment of this disclosure. The apparatus 1300 includes: a first receiving module 1310, a configuration module 1320, and a third transmitting module 1330.

The first receiving module 1310 is configured to receive a maximum support capability set by user equipment for the protocol data unit PDU session, where the maximum support capability set by the user equipment for the PDU session includes at least one of a maximum number of supported authorized quality of service QoS rules, a maximum number of supported packet filters, and/or a maximum number of supported authorized QoS flow descriptions.

The configuration module 1320 is configured to: after the receiving a maximum support capability set by user equipment for the protocol data unit PDU session, configure for the PDU session at least one of an authorized QoS rule, a packet filter, and/or an authorized QoS flow description, based on the maximum support capability set by the user equipment for the PDU session.

The third transmitting module 1330 is configured to transmit, to the user equipment, at least one of the authorized QoS rule, packet filter, and/or authorized QoS flow description configured by the network device for the PDU session.

In a possible implementation, a corresponding number of authorized QoS rules configured by the network device for the PDU session does not exceed the maximum number of supported authorized QoS rules set by the user equipment for the PDU session; a corresponding number of packet filters configured by the network device for the PDU session does not exceed the maximum number of supported packet filters set by the user equipment for the PDU session; and a corresponding number of authorized QoS flow descriptions configured by the network device for the PDU session does not exceed the maximum number of supported authorized QoS flow descriptions set by the user equipment for the PDU session.

In a possible implementation, the first receiving module 1310 is further configured to receive a PDU session release request, and release a resource for the PDU session according to the PDU session release request.

In a possible implementation, the maximum support capability set by the user equipment for the PDU session and received by the first receiving module 1310 is included in a PDU session establishment request message; and the authorized QoS rule, packet filter, or authorized QoS flow description configured by the network device for the PDU session and transmitted by the third transmitting module 1330 is included in a PDU session establishment accept message.

The apparatus 1300 in this embodiment of this disclosure can perform the corresponding steps in the foregoing method embodiment in FIG. 7, and achieve the same or similar functions and beneficial effects. Details are not described herein again.

Figure 14:
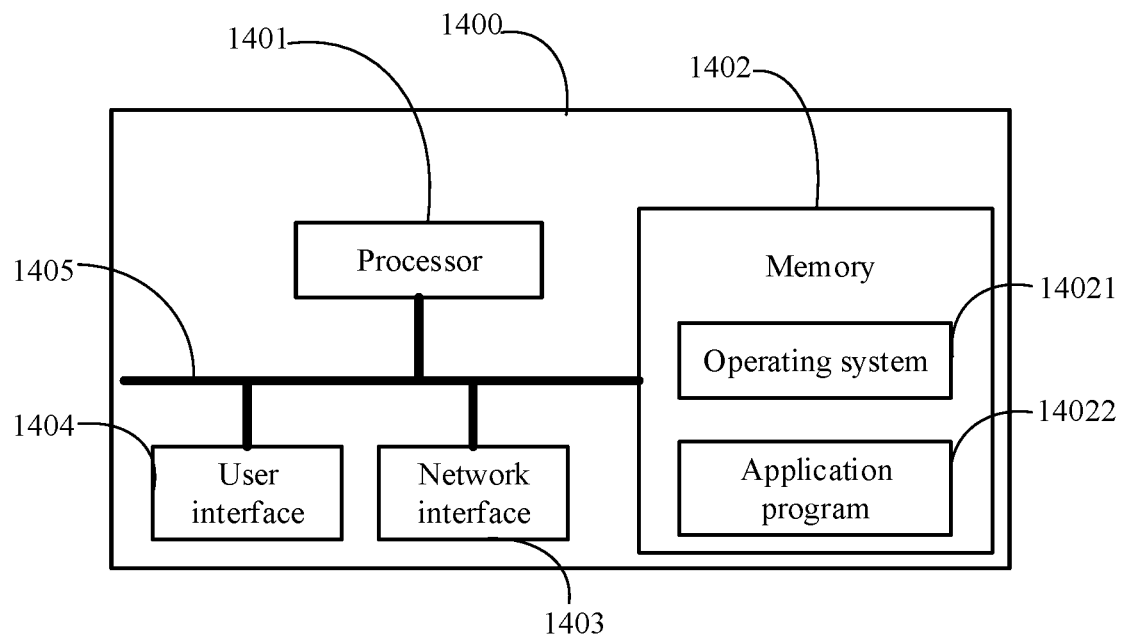
FIG. 14 is a schematic diagram of a hardware structure of an electronic device for executing a method for handling a protocol data unit session according to an embodiment of this disclosure.

FIG. 14 is a schematic diagram of a hardware structure of an electronic device for executing a method for handling a protocol data unit session according to an embodiment of this disclosure. The electronic device may be UE, for example, a terminal device of a user. The terminal device 1400 shown includes at least one processor 1401, a memory 1402, a user interface 1404, and at least one network interface 1403. The components in the terminal device 1400 are coupled together through a bus system 1405. It can be understood that the bus system 1405 is configured to implement connection and communication between these components. In addition to a data bus, the bus system 1405 further includes a power bus, a control bus, and a status signal bus. However, for clear description, various types of buses in the figure are marked as the bus system 1405.

The user interface 1404 may include a display, a keyboard, or a pointing device (for example, a mouse, a trackball, a touch panel, or a touchscreen).

It can be understood that the memory 1402 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 1402 of the system and the method described in the embodiments of this disclosure is intended to include but not limited to these and any other applicable types of memories.

In some implementations, the memory 1402 stores the following elements: executable modules or data structures, or a subset thereof, or an extended set thereof: an operating system 14021 and an application program 14022.

The operating system 14021 includes various system programs, such as a framework layer, a core library layer, and a driver layer, for implementing various basic services and processing hardware-based tasks. The application program 14022 includes various application programs, such as a media player and a browser, which are used to implement various application services. A program for implementing the method in the embodiments of this disclosure may be included in the application program 14022.

In this embodiment of this disclosure, the terminal device 1400 further includes a computer program stored in the memory 1402 and capable of running on the processor 1401.

When the computer program is executed by the processor 1401, the following process is implemented: transmitting a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

Alternatively, when the computer program is executed by the processor 1401, the following process is implemented: transmitting at least one of a maximum number of supported authorized quality of service QoS rules, maximum number of supported packet filters, and/or maximum number of supported authorized QoS flow descriptions set by the user equipment for the protocol data unit PDU session.

When the computer program is executed by a processor, the processes of the methods described above with reference to FIG. 1 to FIG. 3 or the methods described above with reference to FIG. 4 and FIG. 5 are implemented, with the same technical effects achieved. To avoid repetition, details are not described herein again.

The methods disclosed in the foregoing embodiments of this disclosure may be applied to the processor 1401, or may be implemented by the processor 1401. The processor 1401 may be an integrated circuit chip, having a signal processing capability. During implementation, the steps of the foregoing methods may be implemented by hardware integrated logic circuits in the processor 1401 or instructions in the form of software. The foregoing processor 1401 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logical block diagrams that are disclosed in the embodiments of this disclosure. The general-purpose processor may be a microprocessor, or the processor may be any conventional processor or the like. The steps of the methods disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 1402, and the processor 1401 fetches information in the memory 1402, and completes the steps of the foregoing method in combination with its hardware.

Specifically, the computer-readable storage medium stores a computer program. When the computer program is executed by the processor 1401, the following process is implemented: transmitting a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

Alternatively, when the computer program is executed by the processor 1401, the following process is implemented: transmitting at least one of a maximum number of supported authorized quality of service QoS rules, maximum number of supported packet filters, and/or maximum number of supported authorized QoS flow descriptions set by the user equipment for the protocol data unit PDU session.

It can be understood that the embodiments described in this disclosure may be implemented by hardware, software, firmware, middleware, microcode, or a combination thereof. For hardware implementation, a processing unit may be implemented in one or more application-specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in the processor or external to the processor.

An embodiment of this disclosure further proposes a computer-readable storage medium, storing one or more programs. The one or more programs, when executed by a terminal including a plurality of application programs, cause the terminal to perform the following operation: transmitting a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

Alternatively, the one or more programs, when executed by a terminal including a plurality of application programs, cause the terminal to perform the following operation: transmitting at least one of a maximum number of supported authorized quality of service QoS rules, maximum number of supported packet filters, and/or maximum number of supported authorized QoS flow descriptions set by the user equipment for the protocol data unit PDU session.

The computer-readable storage medium includes a read-only memory (ROM), a random access memory (RAM), a magnetic disk, an optical disc, or the like.

When the one or more programs are executed by a processor, the processes of the methods described with reference to FIG. 1 to FIG. 3 or the processes of the methods described with reference to FIG. 4 and FIG. 5 are implemented, with the same technical effects achieved. To avoid repetition, details are not described herein again.

Further, an embodiment of this disclosure further provides a computer program product. The computer program product includes a computer program stored in a non-transitory computer-readable storage medium. The computer program includes a program instruction. When the program instruction is executed by a computer, the following process is implemented: transmitting a protocol data unit PDU session release request to a network device in a case that at least one of an authorized quality of service QoS rule, packet filter, and/or authorized QoS flow description configured by the network device for the PDU session exceeds a maximum support capability set by user equipment for the PDU session.

Alternatively, when the program instruction is executed by a computer, the following process is implemented: transmitting at least one of a maximum number of supported authorized quality of service QoS rules, maximum number of supported packet filters, and/or maximum number of supported authorized QoS flow descriptions set by the user equipment for the protocol data unit PDU session.

When the computer program is executed by a processor, the processes of the methods described with reference to FIG. 1 to FIG. 3 or the processes of the methods described with reference to FIG. 4 and FIG. 5 are implemented, with the same technical effects achieved. To avoid repetition, details are not described herein again.

Figure 15:
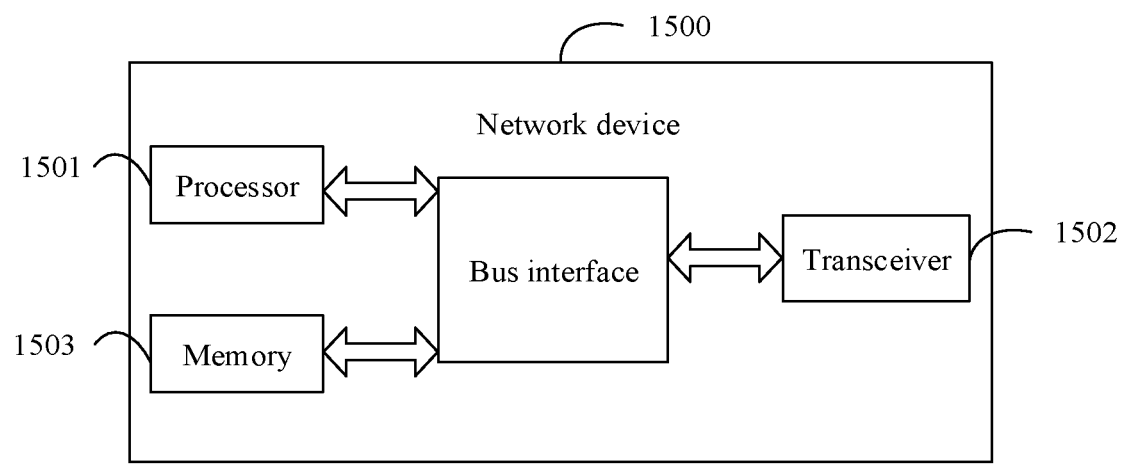
FIG. 15 is another schematic diagram of a hardware structure of an electronic device for executing a method for handling a protocol data unit session according to an embodiment of this disclosure.

FIG. 15 is another schematic diagram of a hardware structure of an electronic device for executing a method for handling a protocol data unit session according to an embodiment of this disclosure. The electronic device may be a network device. As shown in the figure, the network device 1500 includes a processor 1501, a transceiver 1502, a memory 1503, and a bus interface. In this embodiment of this disclosure, the network device 1500 further includes a computer program stored in the memory 1503 and capable of running on the processor 1501. When the computer program is executed by the processor 1501, the following process is implemented: receiving at least one of a maximum number of supported authorized quality of service QoS rules, maximum number of supported packet filters, and/or maximum number of supported authorized QoS flow descriptions set by user equipment for the protocol data unit PDU session.

When the computer program is executed by a processor, the processes of the methods described with reference to FIG. 6 and FIG. 7 are implemented, with the same technical effects achieved. To avoid repetition, details are not described herein again.

In the figure, a bus architecture may include any quantity of interconnected buses and bridges, and specifically connect together various circuits of one or more processors represented by the processor 1501 and a memory represented by the memory 1503. The bus architecture may further interconnect various other circuits such as a peripheral device, a voltage regulator, and a power management circuit. These are all well known in the art, and therefore are not further described in this specification. The bus interface provides interfaces. The transceiver 1502 may be a plurality of components, including a transmitter and a receiver, and provides units for communicating with a variety of other apparatuses on a transmission medium.

The processor 1501 is responsible for management of the bus architecture and general processing, and the memory 1503 may store data for use by the processor 1501 when the processor 1501 performs an operation.

An embodiment of this disclosure further proposes a computer-readable storage medium, storing one or more programs. The one or more programs, when executed by a terminal including a plurality of application programs, cause the terminal to perform the following operation: receiving at least one of a maximum number of supported authorized quality of service QoS rules, maximum number of supported packet filters, and/or maximum number of supported authorized QoS flow descriptions set by the user equipment for the protocol data unit PDU session.

The computer-readable storage medium includes a read-only memory (ROM), a random access memory (RAM), a magnetic disk, an optical disc, or the like.

When the computer program is executed by a processor, the processes of the methods described with reference to FIG. 6 and FIG. 7 are implemented, with the same technical effects achieved. To avoid repetition, details are not described herein again.

Further, an embodiment of this disclosure further provides a computer program product. The computer program product includes a computer program stored in a non-transitory computer-readable storage medium. The computer program includes a program instruction. When the program instruction is executed by a computer, the following process is implemented: receiving at least one of a maximum number of supported authorized quality of service QoS rules, maximum number of supported packet filters, and/or maximum number of supported authorized QoS flow descriptions set by the user equipment for the protocol data unit PDU session.

When the computer program is executed by a processor, the processes of the methods described with reference to FIG. 6 and FIG. 7 are implemented, with the same technical effects achieved. To avoid repetition, details are not described herein again.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPU), an input/output interface, a network interface, and a memory.

The memory may include a form of a non-permanent memory such as a random access memory (RAM) and/or a non-volatile memory such as a read-only memory (ROM) or a flash memory (flash RAM) in computer-readable media. The memory is an example of the computer-readable medium.

Computer-readable media include permanent and non-permanent, removable and non-removable media, and information storage may be implemented by any method or technology. The information may be computer-readable instructions, a data structure, a program module, or other data. Examples of computer storage media include, but are not limited to, a phase-change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cassette, a magnetic tape, a magnetic disk storage or other magnetic storage devices, or any other non-transmission media, which can be used to store information that can be accessed by a computing device. As defined in this specification, the computer-readable medium does not include transitory computer-readable media (transitory media), such as a modulated data signal and carrier.

It should be noted that the terms "include", "comprise", or any other variations thereof are intended to cover a non-exclusive inclusion, so that a process, a method, a commodity, or a device including a set of elements not only includes those elements but also includes other elements that are not expressly listed, or further includes elements inherent to such process, method, commodity, or device. In absence of more constraints, an element preceded by the statement "includes a . . . " does not preclude existence of identical elements in the process, method, commodity, or device that includes the element.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

The foregoing descriptions are only embodiments of this disclosure, but this disclosure is not limited to such embodiments. For a person skilled in the art, this disclosure may have various changes and variations. Any modification, equivalent replacement, and improvement made without departing from the spirit and principle of this disclosure shall fall within the claimed scope of this disclosure.

The foregoing descriptions are merely optional implementations of this disclosure. It should be noted that a person of ordinary skill in the art may make several improvements or polishing without departing from the principle of this disclosure and the improvements and polishing shall also fall within the protection scope of this disclosure.

What is claimed is:

1. A method for handling a protocol data unit session, applied to user equipment and comprising:

transmitting a protocol data unit (PDU) session release request to a network device in a case that at least one of an authorized quality of service (QoS) rule, packet filter, and/or authorized QoS flow description configured by the network device for a PDU session exceeds a maximum support capability set by the user equipment for the PDU session;
wherein the transmitting a PDU session release request to a network device in a case that at least one of an authorized QoS rule, packet filter, and/or authorized QoS flow description configured by the network device for the PDU session exceeds a maximum support capability set by the user equipment for the PDU session comprises:
a maximum support capability set by the user equipment for the PDU session is updated, transmitting a PDU session release request to a network device where at least one of an authorized QoS rule, packet filter, and authorized QoS flow description configured by the network device for the PDU session exceeds an updated maximum support capability.

2. The method according to claim 1, wherein before the transmitting a PDU session release request to a network device, the method further comprises:
obtaining the number of authorized QoS rules, number of packet filters, and/or number of authorized QoS flow descriptions configured by the network device for the PDU session, according to the authorized QoS rule, packet filter, and/or authorized QoS flow description configured by the network device for the PDU session; and
determining whether or not the number of authorized QoS rules, number of packet filters, and/or number of authorized QoS flow descriptions exceeds a maximum support capability set by the user equipment for the PDU session, wherein the maximum support capability set by the user equipment for the PDU session comprises a maximum number of supported authorized Qos rules, maximum number of supported packet filters, and/or maximum number of supported authorized QoS flow descriptions configured by the user equipment for the PDU session.

3. The method according to claim 1, wherein the PDU session release request comprises a release cause for indicating lack of resources;
and/or,
wherein the at least one of the authorized QoS rule, packet filter, and/or authorized Qos flow description is comprised in a PDU session establishment accept message.

4. A method for handling a protocol data unit session, applied to user equipment and comprising:
transmitting a maximum support capability set by the user equipment for the protocol data unit (PDU) session to a network device, wherein the maximum support capability set by the user equipment for the PDU session comprises at least one of a maximum number of supported authorized quality of service (QoS) rules, a maximum number of supported packet filters, and/or a maximum number of supported authorized QoS flow descriptions;
wherein after the transmitting a maximum support capability set by the user equipment for the PDU session to a network device, the method further comprises:
receiving at least one of an authorized QoS rule, packet filter, and/or authorized Qos flow description configured by the network device for the PDU session;
wherein after the receiving, the method further comprises:
the maximum support capability set by the user equipment for the PDU session is updated, transmitting a PDU session release request to the network device where the at least one of the authorized QoS rule, packet filter, and authorized QoS flow description configured by the network device for the PDU session exceeds an updated maximum support capability.

5. The method according to claim 4, wherein a corresponding number of authorized QoS rules configured by the network device for the PDU session does not exceed the maximum number of supported authorized QoS rules set by the user equipment for the PDU session;
a corresponding number of packet filters configured by the network device for the PDU session does not exceed the maximum number of supported packet filters set by the user equipment for the PDU session; and
a corresponding number of authorized Qos flow descriptions configured by the network device for the PDU session does not exceed the maximum number of supported authorized Qos flow descriptions set by the user equipment for the PDU session.

6. The method according to claim 4, wherein the maximum support capability set by the user equipment for the PDU session is comprised in a PDU session establishment request message; and
the authorized QoS rule, packet filter, and/or authorized QoS flow description configured by the network device for the PDU session is comprised in a PDU session establishment accept message.

7. A method for handling a protocol data unit session comprising:
receiving, by a network device, a maximum support capability for the protocol data unit (PDU) session from user equipment, wherein the maximum support capability for the PDU session is set by the user equipment for the PDU session, and comprises at least one of a maximum number of supported authorized quality of service (QoS) rules, a maximum number of supported packet filters, and/or a maximum number of supported authorized QoS flow descriptions;
wherein after the receiving by a network device a maximum support capability for the protocol data unit PDU session from user equipment, the method further comprises: configuring, by the network device, for the PDU session an authorized QoS rule, a packet filter, and/or an authorized QoS flow description, based on the maximum support capability set by the user equipment for the PDU session; and
transmitting by the network device, to the user equipment, the authorized QoS rule, packet filter, and/or authorized QoS flow description configured by the network device for the PDU session;
wherein the method further comprises:
the maximum support capability set for the PDU session is updated, receiving, by the network device, a PDU session release request where at least one of the authorized QoS rule, packet filter, and/or authorized QoS flow description configured by the network device for the PDU session exceeds an updated maximum support capability.

8. The method according to claim 7, wherein the method further comprises:
releasing a resource for the PDU session according to the PDU session release request.

9. The method according to claim 7, wherein the maximum support capability for the PDU session is comprised in a PDU session establishment request message; and
the authorized QoS rule, packet filter, and/or authorized QoS flow description configured by the network device for the PDU session is comprised in a PDU session establishment accept message;

and/or, wherein a corresponding number of authorized QoS rules configured by the network device for the PDU session does not exceed the maximum number of supported authorized Qos rules set by the user equipment for the PDU session;

a corresponding number of packet filters configured by the network device for the PDU session does not exceed the maximum number of supported packet filters set by the user equipment for the PDU session; and a corresponding number of authorized QoS flow descriptions configured by the network device for the PDU session does not exceed the maximum number of supported authorized Qos flow descriptions set by the user equipment for the PDU session.

10. An electronic device, comprising:

a processor; and a memory storing a computer-executable instruction, wherein when the executable instruction is executed, the processor is used to execute the method according to claim 1.

11. The electronic device according to claim 10, wherein the PDU session release request comprises a release cause for indicating lack of resources;

and/or, wherein the at least one of the authorized QoS rule, packet filter, and/or authorized Qos flow description is comprised in a PDU session establishment accept message.

12. An electronic device, comprising:

a processor; and a memory storing a computer-executable instruction, wherein when the executable instruction is executed, the processor is used to execute the method according to claim 5.

13. An electronic device, comprising:

a processor; and a memory storing a computer-executable instruction, wherein when the executable instruction is executed, the processor is used to execute the method according to claim 10.

14. A non-transitory computer-readable storage medium, wherein the non-transitory computer-readable storage medium is configured to store a computer-executable instruction, and when the computer-executable instruction is executed by a processor, the method according to claim 1 is implemented.

15. A non-transitory computer-readable storage medium, wherein the non-transitory computer-readable storage medium is configured to store a computer-executable instruction, and when the computer-executable instruction is executed by a processor, the method according to claim 5 is implemented.

16. A non-transitory computer-readable storage medium, wherein the non-transitory computer-readable storage medium is configured to store a computer-executable instruction, and when the computer-executable instruction is executed by a processor, the method according to claim 10 is implemented.

* * * * *